Figure 1:
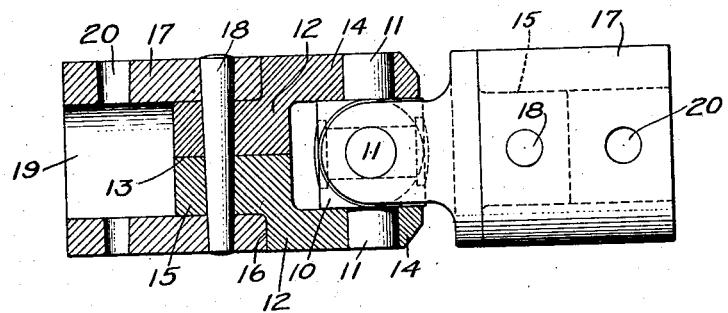

Feb. 2, 1932.    R. M. GALLOWAY ET AL    1,843,764

UNIVERSAL JOINT

Filed Feb. 17, 1928

Inventors
Robert M. Galloway
John M. Meloy
By Attorneys
Nathan & Bowman

Patented Feb. 2, 1932

1,843,764

UNITED STATES PATENT OFFICE

ROBERT M. GALLOWAY AND JOHN M. MELOY, OF RICHMOND, INDIANA, ASSIGNORS TO THE NATIONAL AUTOMATIC TOOL COMPANY, OF RICHMOND, INDIANA, A CORPORATION OF INDIANA

UNIVERSAL JOINT

Application filed February 17, 1928. Serial No. 254,945.

Universal joints to which this invention relates, being designed to transmit rotary motion only, are subjective in many cases to relatively high torsional forces. These forces are materially increased by other forces resulting from the indirect transmission when the conjugate shaft ends are arranged at a substantial angle relative to each other. The total resultant forces must be provided for by the bearings within the joint which, in addition to providing for these forces, must permit of coacting parts to freely swivel upon each other.

For the above reasons ample and continuous lubrication are of prime importance. Owing to the fact, however, that these joints must remain in a suspended position remote from fixed bearings, the continuous lubrication of such devices presents unusual and peculiar problems.

The present invention is designed to meet these problems in a most efficient manner. The general features of the construction include a central member having therein a reservoir for oil with radial passages leading to the particular surfaces to be lubricated. As further specific features of the construction the reservoir has inserted therein oil absorbing material. The radial passages leading to the bearing surfaces communicate with the upper portion of the reservoir and the inserted wick whereby lubrication may proceed through capillary action occuring thru the wick and the relatively small radial passages. The flow of lubricant is further aided by centrifugal action. The arrangement results in a continuous and constant flow, in contrast to an intermittent and at times excessive flow such as would be the case e. g. if oil were supplied by passages leading into the bottom of a reservoir.

A universal joint of such a type as is disclosed herein includes a center block having trunnions extending radially therefrom upon which the driven members are adapted to be pivoted. It was observed that in many universal joints of this type heretofore employed the lubrication was not positive and dependable. A study of this situation led to the discovery that lubrication was prevented by reason of the fact that the trunnions being inserted in blind openings in the members swiveled thereon; that upon the joint becoming heated, through a short period of operation, the air confined at the outer end of the trunnion would expand and resist the outward flow of the oil, or even force it inward.

The present invention discloses a very simple, yet efficient remedy for this situation, which consists of machining the trunnion openings entirely through the supported member, whereby the free outward flow of the lubricating oil is unimpeded.

A further difficulty involved in the universal joints of the particular type disclosed herein, which otherwise have proved extremely practical and simple to manufacture, resulted from the nature of the required construction. Since spaced arms are required to be fitted over the ends of the radially extending trunnions the most practical method of manufacturing and assembly has been found to form these as similar and complemental parts. The arms are then required to be secured together in place and to the respective shaft end. A method of accomplishing this has been to form the outer adjacent ends as a reduced portion, permitting the assembly thereover of a sleeve member the inner surface of the sleeve and the corresponding surface of the arms being beveled in order that the general contour of the joint might be smooth in appearance, and with little possibility of snaring articles of clothing or other exterior objects. It has been found impossible, however, with such construction to provide a complete bearing between the arms or drive members and the retaining sleeve member. The usual result was that the complemental drive members were secured together only at a relatively small portion of the outer ends. In view of the forces required to be transmitted by these drive members, such a securing means was insufficient to prevent the drive members from spreading or slipping sidewise relative to each other at their inner ends.

The present invention provides a construction which eliminates this possibility and provides a very rigid securing means for these elements. The drive members are so machined as to leave an abrupt square shoulder at the inner end of the reduced portion. The sleeve member is driven on the reduced portion into firm engagement with the square shoulder, in which position it is securely pinned. The resultant structure presents a smooth exterior surface and an assembly which closely approaches the rigidity of a solid member.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 3:
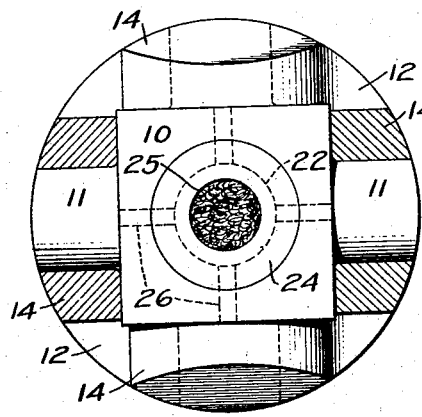
Figure 2:
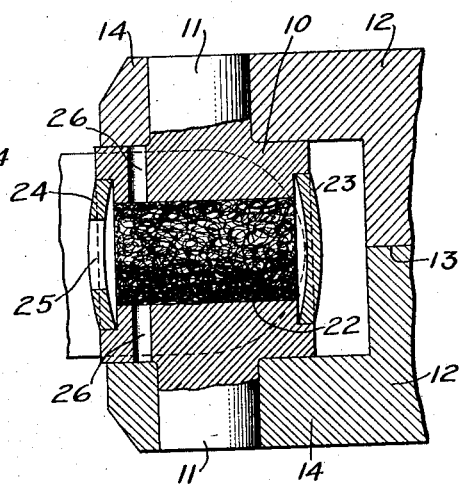

Figure 1 is an assembly view of the universal joint, with portions thereof shown in section. Fig. 2 is an enlarged longitudinal sections showing particularly the center block, and Fig. 3 is a view similar to Fig. 2 looking from the left thereof.

The general features of the construction include the center block 10, having thereon the outwardly projecting trunnions 11, upon which are pivoted the drive sides 12, there being four in number of these in the present construction. The drive sides are assembled in a complemental fashion, the inner faces 13 being plane to firmly engage each other. The inner ends of the complemental drive sides provide spaced arms 14, having suitable openings for pivotal connections on the trunnions 11. The drive sides are so machined that after assembly they present an outer symmetrical reduced portion 15, which terminates adjacent the spaced arms in a square shoulder 16. A sleeve member 17 snugly fits over the reduced portion 15, and is forced into tight engagement with the shoulder 16, being secured in position by the tapered pin 18. The remaining portion 19 of the cylindrical sleeve opening is adapted to receive the respective shaft ends which may be secured therein by a pin inserted within the opening 20 in a manner similar to the securing of the sleeve member on the drive sides.

In so far as the construction has been described the opposite ends of the universal joint are symmetrical and various elements are interchangeable. With respect to the drive sides, especially, these sides being made with a sharp definite contour they may more easily be made exactly alike and interchangeable than if the reduced portion gradually merged into the spaced arm portion rather than having the square shoulder 16.

The means of assembling the sleeve members and the drive sides 12 described results in a very rigid construction, well adapted to provide for the forces transmitted thereto. It is apparent that the means for securing the drive sides together is brought as closely adjacent the spaced arms as possible, and that the shoulder construction prevents any spreading of the arms or any twisting thereof relative to each other, which would have a tendency to cause a relative slippage along the plane surfaces 13.

A primary feature of this invention relates to the lubricating means which will now be described. The center block 10 has formed therewithin the central opening 22, which has inserted therein a felt, or any other suitable fibrous oil retaining material. The ends of the opening 22 are closed by means of the welsh plugs 23 and 24, which are expanded into tight engagement therein by the application of pressure. The plug 24 is provided with an opening 25 therein, through which lubricating oil may be inserted in any suitable manner. Oil is conducted to the trunnions 11 and adjacent surfaces through the passages 26.

The joint may be used in any position, but as shown herein is especially adapted to being employed in a substantially vertical position. An advantageous application of the joint may be made in a multiple spindle drilling machine for the individual drill spindle driving connections. Certain features of this present construction are peculiarly adapted for such operation. In the present instance, for example, the joint would be so arranged that the opening 25 would be uppermost for the easy application of the oil thereto. In such position the passages 26 lead from the top of the reservoir to a point adjacent the upper portion of the trunnions, from which point the oil may more completely cover the entire bearing surfaces of the trunnions. By reason of the felt packing within the reservoir and the openings 26 being located at the upper portion of the reservoir the process of lubrication is a continuous flow of oil to the bearings by capillary action thru the inserted felt and relatively small radial passages, no excess amounts being supplied thereto at any time. The flow of lubricant is also aided by centrifugal action. With the general arrangement shown a continuous and constant flow of the oil in the desired amount results and such lubrication is maintained with but infrequent filling of the reservoir.

As a further feature of this invention, it will be observed that the openings within the drive members 12 for the trunnions extend through the outer surface. This construction was provided as a result of the discovery that when these openings were not drilled clear through, a pocket of air was formed at the outer end of the trunnions 11, and that after a short operation the air would become heated and in expanding would resist and even force the oil around the trunnions inwardly toward the center block. With the present construction the outward continuous flow of the oil is unimpeded and the bearings are, therefore, amply lubricated at all times, which is a very desirable feature in a construction of this type wherein the bearings are often subjected to severe forces as a result of high torsional forces combined in many cases with unavoidable forces resulting from angular displacement of the conjugate shafts.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:—

Having thus revealed this invention, we claim as new and desire to secure the following combinations and elements or equivalents thereof, by Letters Patent of United States:—

1. A universal joint comprising a central member; upper and lower connecting members adapted to be secured to conjugate ends of substantially vertical shaft ends; trunnions on said central member for pivotally supporting said connecting members; an oil reservoir in said central member; fibrous oil-packing material therein; and radial passages through said central member leading from the upper portion of said reservoir to points adjacent to and above said trunnions to supply oil to the surfaces of said trunnions.

2. A universal joint combining a center block affording two pairs of transversely arranged bearing surfaces; pairs of trunnions extending outwardly from said bearing surfaces in transverse directions; complemental pairs of drive sides fitted to the bearing surfaces of said block and journaled on said pairs of trunnions, said pairs of drive sides extending in opposite directions from said trunnions and being adapted to be connected with driving and driven shafts respectively; said center block being provided with a central bore extending vertically through said block and affording a lubricant reservoir, a plug closing, against leakage, the lower end of said bore; fibrous oil-packing material in said bore; and radial ducts formed in said center block, wholly above said trunnions, and connecting said reservoir with the bearing faces of said block above said trunnions.

3. A universal joint combining a center block having pairs of laterally projecting trunnions thereon, and a vertical bore in said block with a closed lower end forming a lubricant reservoir; pairs of complemental drive sides journaled on pairs of said trunnions and oppositely extending from said block, said pairs of drive sides being adapted to be connected with driving and driven shafts respectively, fibrous oil-packing material in said reservoir; and radial ducts in said center block wholly above said trunnions leading from the upper end of said reservoir to the juncture of said trunnions respectively with said center block.

In witness whereof, we have hereunto subscribed our names.

ROBERT M. GALLOWAY.
JOHN M. MELOY.

CERTIFICATE OF CORRECTION.

Patent No. 1,843,764. Granted February 2, 1932, to

ROBERT M. GALLOWAY ET AL.

It is hereby certified that error appears in the printed specification of the above numbered patent requiring correction as follows: Page 3, line 44, claim 1, after the word "the" insert the word bearing; and that the said Letters Patent should be read with this correction therein that the same may conform to the record of the case in the Patent Office.

Signed and sealed this 22nd day of March, A. D. 1932.

(Seal)

M. J. Moore,
Acting Commissioner of Patents.